US005953312A

United States Patent [19]
Crawley et al.

[11] Patent Number: 5,953,312
[45] Date of Patent: Sep. 14, 1999

[54] METHOD AND APPARATUS FOR DETERMINING ALTERNATE ROUTES IN A NETWORK USING A CONNECTION-ORIENTED PROTOCOL

[75] Inventors: Eric S. Crawley, Maynard, Mass.; Paul N. Goransson, Eliot, Me.; Shu Ching Shieh, Nashua; Gregory A. Burch, Manchester, both of N.H.

[73] Assignee: Bay Networks, Santa Clara, Calif.

[21] Appl. No.: 08/710,267

[22] Filed: Sep. 13, 1996

[51] Int. Cl.$^6$ ................................................... H04L 12/50
[52] U.S. Cl. ............................................ 370/218; 370/237
[58] Field of Search ....................................... 370/216, 217, 370/218, 219, 220, 222, 223, 224, 227, 228, 395, 289, 230, 231, 235, 233, 234, 237, 351, 352, 353, 389, 468, 471, 431, 444, 439, 408, 407, 406, 455, 462; 395/181.01; 379/221; 340/827, 825.03

[56] References Cited

U.S. PATENT DOCUMENTS

| | | | |
|---|---|---|---|
| 4,991,204 | 2/1991 | Yamamoto et al. | 370/217 |
| 5,067,127 | 11/1991 | Ochiai | 370/238 |
| 5,657,320 | 8/1997 | Russ et al. | 370/217 |
| 5,671,215 | 9/1997 | Folar | 370/217 |

OTHER PUBLICATIONS

Experimental Internet Stream Protocol, Version 2 (ST–II), Network Working Group Request for Comments: 1190, CIP Working Group, Oct. 1990.

Internet Stream Protocol Version 2 (ST2) Protocol Specification—Version ST2+, Network Working Group Request for Comments: 1819, ST2 Working Group, Aug. 1995.

Private Network—Network Interface Specification Version 1.0 (PNNI 1.0), the ATM Forum Technical Committee, af–pnni–0055.000, Mar. 1996.

*Primary Examiner*—Dang Ton
*Attorney, Agent, or Firm*—Blakely, Sokoloff, Taylor & Zafman

[57] ABSTRACT

A system for selecting an alternate route in a network using a connection-oriented protocol. The system is implemented in response to inadequate resources to a normal next hop node for a requested connection. The system may also be implemented if the normal next hop node is not capable of supporting the requested data flow. An alternate next hop node is identified having adequate resources for the requested connection. The connection request is then sent to the alternate next hop node. A refusal message is generated if the connection request sent to the alternate next hop node fails. The identification of alternate next hop nodes having adequate resources is performed on a limited basis.

29 Claims, 4 Drawing Sheets

METHOD AND APPARATUS FOR DETERMINING ALTERNATE ROUTES IN A NETWORK USING A CONNECTION-ORIENTED PROTOCOL

BACKGROUND OF THE INVENTION

1. Field of the Invention

The present invention relates to networks. More specifically, the invention provides a system for determining alternate routes in a network using a connection-oriented protocol.

2. Background

Networks provide a mechanism for exchanging data between various nodes in the network and between devices coupled to the network. Various types of protocols may be used for propagating data through a single network or through multiple interconnected networks. A connection-oriented protocol is an example of a network routing protocol which establishes a connection between a source and a destination and transfers data along the established connection. The established connection typically includes a series of links through intermediate nodes in the network. Once the connection has been established, all data for a particular data flow travels across the same path. Asynchronous Transfer Mode (ATM), Internet Stream Protocol, Ver. 2 (ST2) and Frame Relay are examples of connection-oriented protocols.

Connection-oriented protocols may include Quality of Service (QoS) requirements for transferring or routing data through a network. QoS may be specified in terms of minimum bandwidth requirements, transmission delay, the amount of memory or buffer space required for the data flow, and other resource parameters. In systems using QoS parameters, various links in the network may be incapable of providing adequate resources for the required QoS. In these situations, it is necessary to locate a path through the network in which each node and link along the path has adequate resources to support the requested data flow. Thus, if the normal routing procedures identify a path containing one or more links without adequate resources for the requested data flow, an alternate path must be identified. If an alternate path having adequate resources cannot be identified, then a connection refusal signal is generated and propagated back to the source indicating that the requested QoS is not available to the destination.

Various procedures may be used for identifying an alternate path through the network between a source and a destination. One approach for identifying an alternate path considers every possible path through the network. Although this approach provides the greatest likelihood that an acceptable alternate path will be located, the approach is time-consuming and requires considerable computational resources each time an alternate path must be identified. Therefore, it is desirable to provide a system for identifying alternate paths requiring less time and computational resources than the approach discussed above.

SUMMARY OF THE INVENTION

The present invention provides a system for identifying an alternate path in a network using a connection-oriented protocol. Rather than performing a complete search or exploration of the network for all possible alternate paths, the invention performs a limited search for an alternate path from the source node to the destination node. The alternate path is selected based on a list of well-interconnected neighboring nodes which are not the ingress node and not an egress node on the normal or typical path. If the limited attempt to establish the selected alternate path fails, then the procedure terminates without selecting or attempting to select another alternate path. This failure also prompts the generation of a connection refusal signal which is propagated back to the source node, indicating that the requested Quality of Service (QoS) is not available to the destination node.

An embodiment of the present invention is implemented in response to inadequate resources to a normal next hop node for a requested QoS. An alternate next hop node is identified having adequate resources for the requested QoS and capable of implementing the connection-oriented protocol. The connection request is then sent to the alternate next hop node. A refusal message is generated if the connection request to the alternate next hop node fails.

Another feature of the present invention provides for the determination of the alternate next hop node using a neighbor table.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

The present invention is related to a system for identifying an alternate path in a network using a connection-oriented protocol. Rather than performing a complete search or exploration of the network for all possible alternate paths, an embodiment of the invention provides a limited search for an alternate path from the source node to the destination node. The alternate path is selected based on a list of well-interconnected neighboring nodes (e.g., routers or switches) which are neither the ingress node nor the egress node on the normal or typical path. The ingress node is the previous node on the path which sent a connection request message to the current node. The egress node is the next hop node on the normal path which would be selected using normal routing procedures. If the attempt to establish the selected alternate path fails, then the procedure terminates without selecting or attempting to select another alternate path. This failure also prompts the generation of a connection refusal signal which is propagated back to the source node, indicating that the requested Quality of Service (QoS) is not available to the destination node.

Thus, rather than performing a complete exploration of the entire network in search of an alternate path to the destination, the inventive system makes a limited attempt to select an alternate path. If the selected alternate path fails, no additional attempts are made to identify another alternate path. This system minimizes the time required to search for an alternate path, and reduces the computational complexity of the alternate path selection procedure.

In another embodiment of the invention, a small number of additional attempts to select an alternate path may be performed. In this embodiment, additional time and computing resources may be required to perform the additional alternate path selections. However, the system does not perform a complete exploration of the network, thereby requiring less time and fewer computational resources. The number of alternate attempts to be performed may be determined by the network administrator based on network topology, available resources, and similar factors. Each node in the network need not perform the same number of alternate path selection attempts. For example, one node may be set to perform a maximum of one alternate path selection while other nodes may be set to perform a maximum of three or more alternate path selections.

Figure 1:
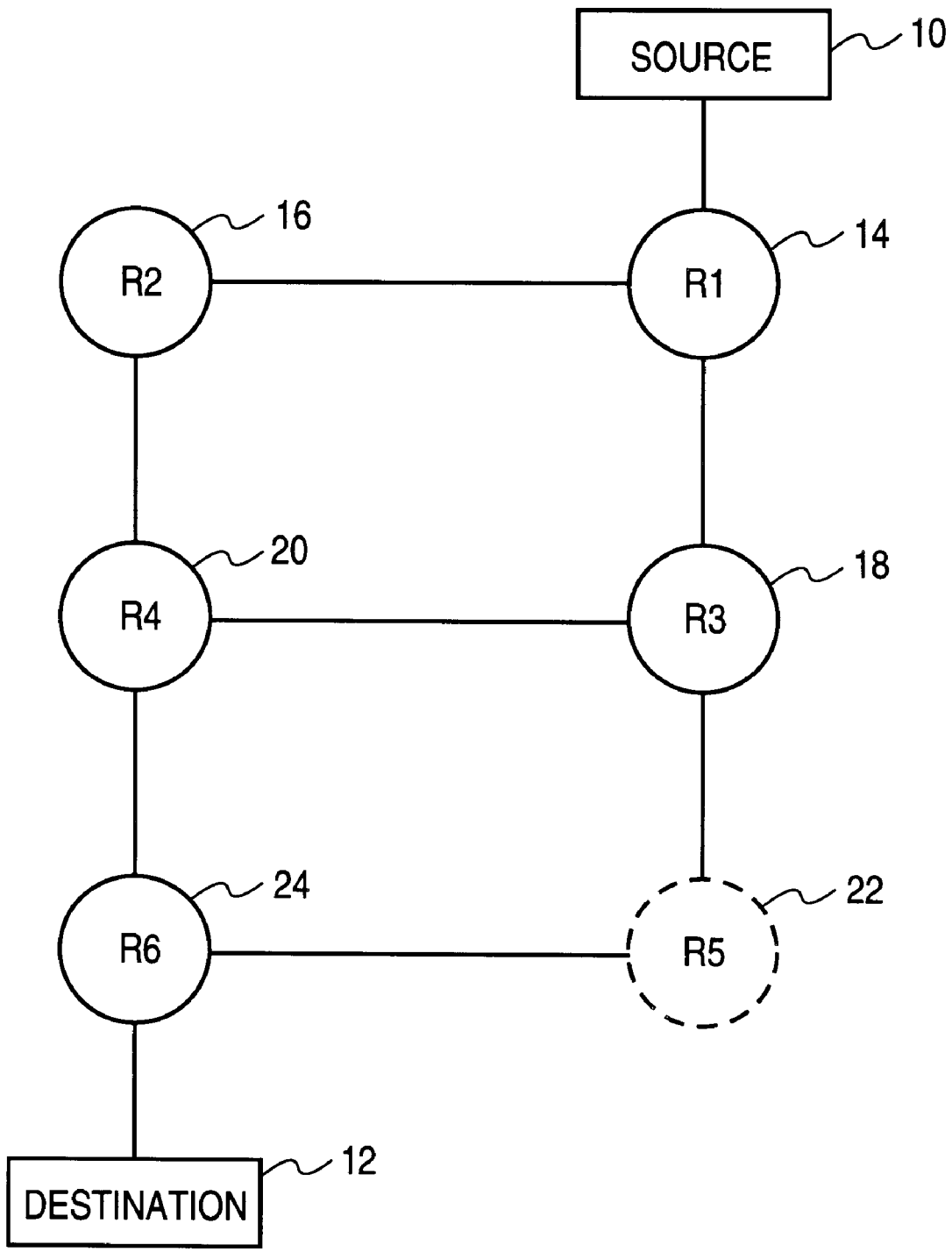
FIG. 1 illustrates an example network having a source node, a destination node, and various intermediate nodes.

An example network is illustrated in FIG. 1, and includes a source node 10 and a destination node 12. Various intermediate routers R1, R2, R3, R4, R5 and R6 (reference numerals 14–24) are coupled to one another as shown. An embodiment of the invention uses the Internet Stream Protocol, Version 2 (ST2). Alternate embodiments of the invention may utilize other connection-oriented protocols such as Asynchronous Transfer Mode (ATM) and Frame Relay.

A particular embodiment of the invention will be described with reference to the network illustrated in FIG. 1 using the ST2 protocol. Note that the network shown in FIG. 1 is simplified for illustration purposes. An actual network may contain multiple nodes capable of functioning as a source node or a destination node, and may include hundreds or thousands of intermediate nodes and links. In describing FIG. 1, nodes 14–24 will be referred to as routers. However, those skilled in the art will appreciate that nodes 14–24 may be any type of communications device for switching or routing device, such as an ATM switch used in an ATM network.

Two different types of ST2 stream routing may be performed: IP-Inherited routing and ST2 Exploratory Routing. IP-Inherited routing is based on routing information obtained from the IP (Internet Protocol) routing tables. Route entries in the IP routing tables may be received from various sources including the network administrator (IP Default Routes), Open Shortest Path First (OSPF), and other route-learning protocols such as Exterior Gateway Protocol (EGP) and Border Gateway Protocol (BGP). ST2 Exploratory Routing is based on routes discovered by user-configured cooperating ST2 neighbor nodes.

Initially, the routing procedure attempts to establish a route by using IP-Inherited routing. If this is not possible, because the next hop node is not ST2-capable or is lacking adequate resources, then the inventive routing system attempts to establish stream routing using the ST2 Exploratory Routing method. In the network illustrated in FIG. 1, all routers except router 22 (R5) are ST2-capable; i.e. capable of sending data using the ST2 routing protocol. Since router 22 is not ST2-capable, it cannot be considered as a next hop router when using the ST2 routing protocol. Routers R1, R2, R3, R4, and R6 are identified as ST2-capable by a solid circular symbol. Router R5 is identified as not being ST2-capable by a broken circular symbol.

Figure 2:
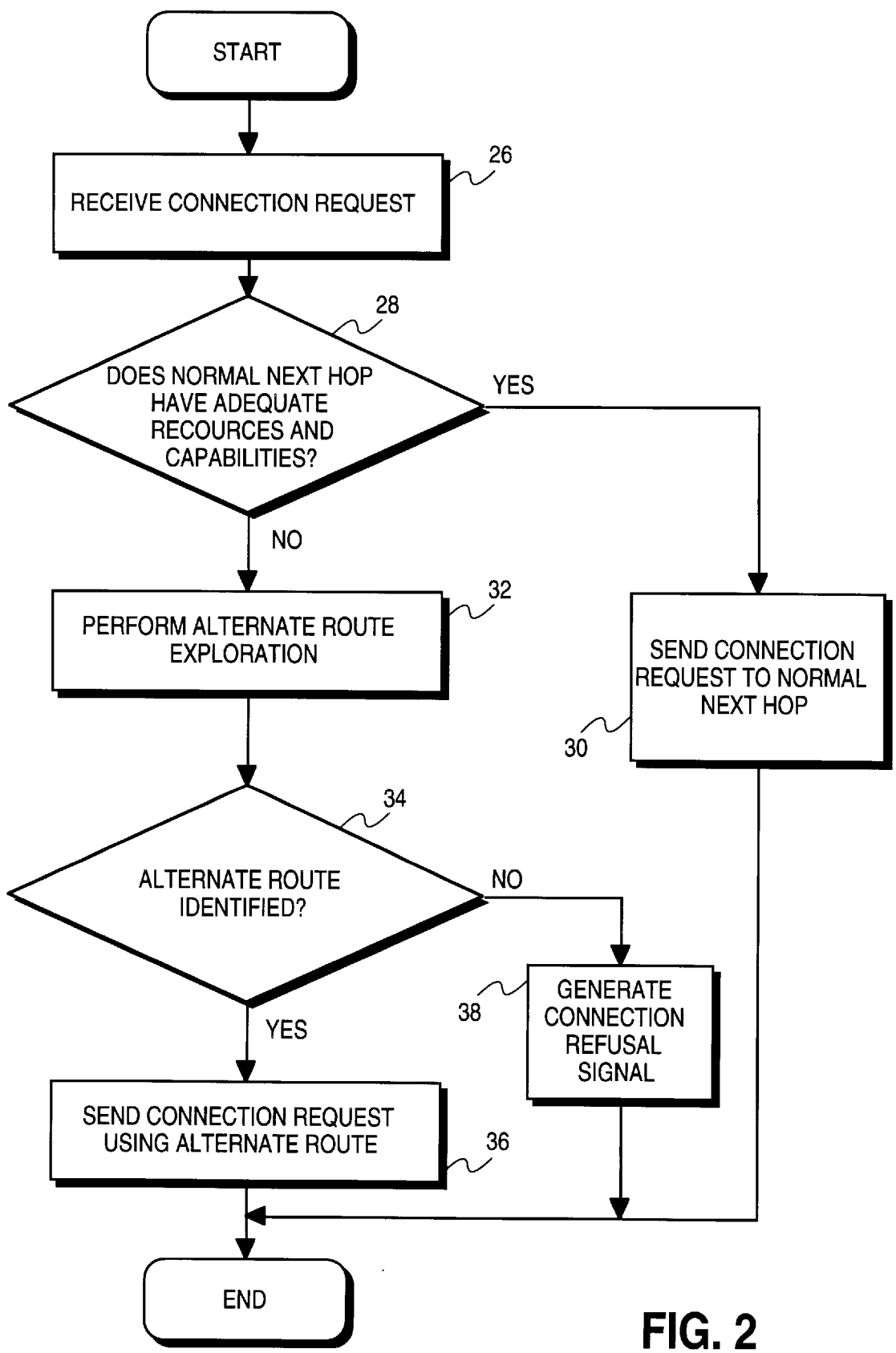
FIG. 2 is a flow diagram illustrating an embodiment of a procedure for identifying a next hop node.

FIG. 2 is a flow diagram illustrating an embodiment of the inventive procedure for identifying a next hop node. At step 26, a receiving node in the network receives a connection request message from the ingress node (e.g., the source node or immediate upstream node). The connection request message may include QoS parameters such as the bandwidth required for the requested data flow. When the connection request is received by the receiving node, the receiving node performs a routing decision based on its normal IP routing protocol. At step 28 of FIG. 2, the receiving node determines whether the normal next hop node has adequate resources and capabilities for the requested data flow. Step 28 may consider protocol capability, available resources, time of day, and any other policies established to determine whether a particular node may be used. If adequate resources and capabilities are identified at step 28, then the procedure branches to step 30 where the connection request message is sent to the normal next hop node, and the procedure terminates with respect to the receiving node.

If the normal next hop node does not have adequate resources or lacks the necessary capabilities for the requested data flow, then the procedure branches from step 28 to step 32 where alternate route exploration is performed. As discussed above, the alternate route exploration performed at step 32 is a limited exploration of the network nodes neighboring the receiving node. Additional details regarding the alternate route exploration procedure are provided below with reference to FIG. 3.

Step 34 in FIG. 2 determines whether an alternate route was identified by the alternate route exploration procedure at step 32. If an alternate route was identified, step 36 sends the connection request message to the next node on the alternate route. If an alternate route was not successfully identified at step 34, then the procedure branches to step 38 where a connection refusal signal is generated and propagated back to the source node indicating that resources are not available for the requested data flow.

Figure 3:
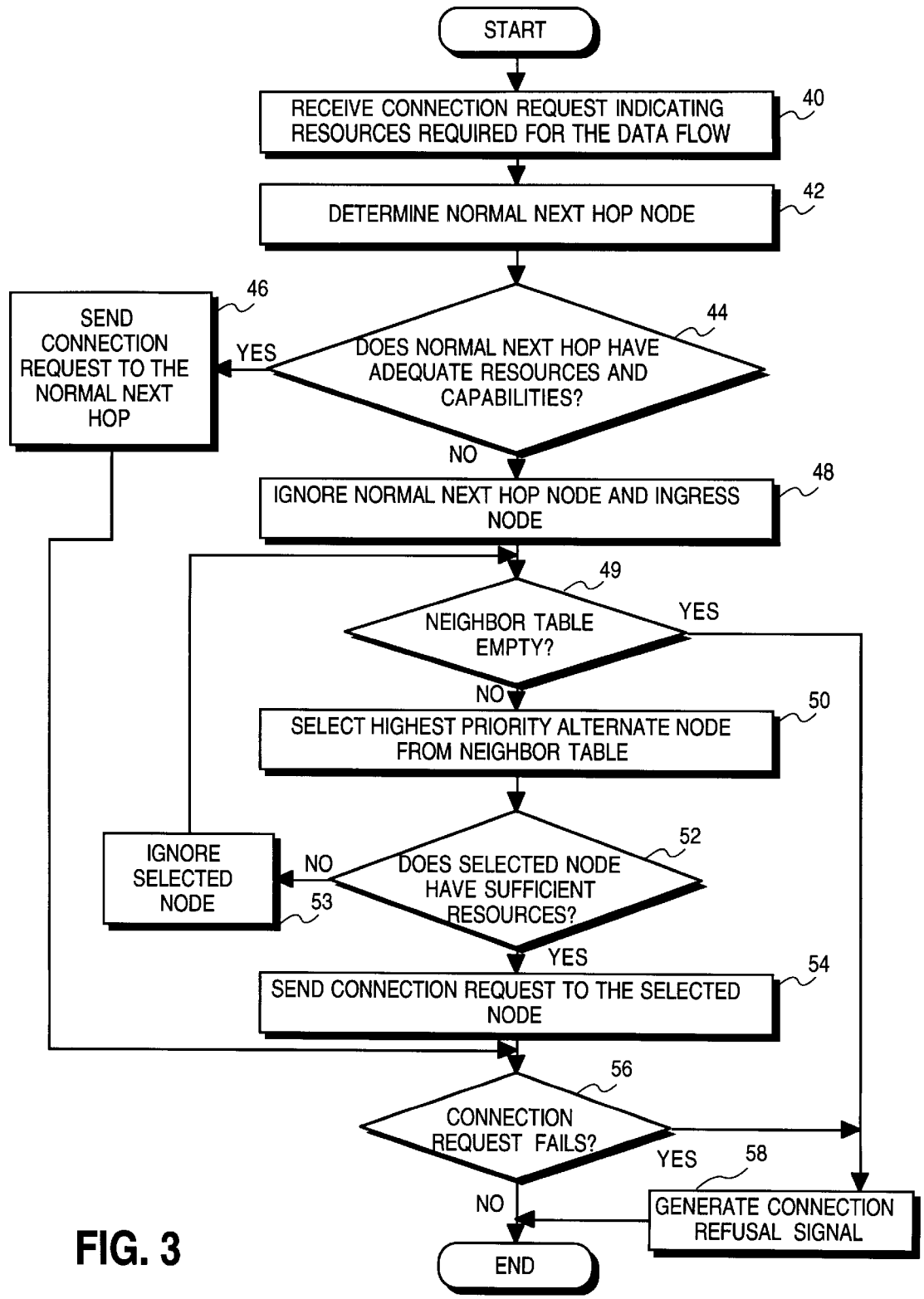
FIG. 3 is a flow diagram showing an embodiment of a procedure for determining an alternate route if the normal next hop node does not have adequate resources for the requested data flow.

FIG. 3 is a flow diagram illustrating an embodiment of a procedure for identifying a next hop node in a network. FIG. 3 illustrates in greater detail the alternate route exploration procedure identified in FIG. 2 at step 32. Steps 40 and 42 of FIG. 3 illustrate the normal procedure performed by a receiving node upon receipt of a connection request message. Step 44 is similar to step 28 in FIG. 2 and determines whether the normal next hop node has adequate resources and capabilities for the requested data flow. If the normal next hop node has adequate resources and capabilities, then step 46 sends the connection request message to the normal next hop node.

If the normal next hop node does not have adequate resources for the requested data flow or lacks the necessary capabilities, then step 48 of FIG. 3 ignores the normal next hop node and the ingress node in the neighbor table associated with the receiving node. The neighbor table is a list of neighboring nodes immediately adjacent the receiving node. The neighbor table includes a priority associated with each neighbor node and information regarding each neighbor node's ability to perform route exploration. The neighbor table is configured by the network administrator and stored in the receiving node itself. Typically, the neighbor node is maintained in a configuration file stored within the receiving node.

Each node in a network capable of route exploration has an associated neighbor table. Each neighbor listed in a neighbor table may have two associated identifiers. A first identifier indicates whether the neighbor is capable of route exploration, and a second identifier indicates the priority of the neighbor node relative to other neighboring nodes. When a new node is added to the network, the network administrator generates a neighbor table for the new node. Additionally, each neighbor of the new node will require updating of the existing neighbor table to identify the new node and the priority/route exploration capability of the new node. Additional details and examples regarding neighbor tables are provided below.

At step 48 in FIG. 3, the normal next hop node is ignored since it was already determined in step 44 that the normal next hop node does not have adequate resources for the requested data flow. Step 48 also ignores the ingress node to prevent selection of the ingress node as the next hop node. Step 49 then determines whether the neighbor table is empty; i.e., whether any selectable nodes remain in the neighbor table. If the neighbor table is empty (i.e., all nodes in the table are being ignored or are not exploration-capable), then the procedure branches to step 58 where a connection refusal signal is generated and propagated back to the source node.

If the neighbor table is not empty at step 49, then step 50 selects the highest priority alternate node from the nodes remaining in the neighbor table. The procedure continues to step 52 to determine whether the selected alternate node has sufficient resources for the requested data flow. If the selected node lacks sufficient resources, then step 53 ignores the selected node in the neighbor table and returns to step 49 to determine whether the neighbor table is empty. This procedure continues until the neighbor table is empty or an alternate node has been selected with sufficient resources. If step 52 determines that an alternate node with sufficient resources has been selected, then step 54 sends the connection request message to the selected node.

At step 56, if the connection request fails, then the procedure continues to step 58 where a connection refusal signal is generated and propagated back to the source node. In this embodiment of the invention, if the connection message fails, the procedure does not attempt to locate another alternate node or alternate path, but instead generates a connection refusal signal and terminates. In alternate embodiments of the invention, one or more additional attempts to locate an alternate path may be performed. However, the number of additional attempts is limited to reduce the time and computational resources utilized in locating alternate paths.

An example of the alternate route exploration procedure will be illustrated with respect to the network shown in FIG. 1. In this example, assume that source node 10 has a particular data flow requiring a certain QoS to destination node 12. Source node 10 generates a connection request message and transmits the connection request to router R1. As discussed above, router R1 has a neighbor table, an example of which is illustrated in Table 1 below.

TABLE 1

| Neighbor Node | Exploration-Capable? | Priority |
| --- | --- | --- |
| R2 | Yes | 1 |
| R3 | Yes | 2 |

As illustrated in Table 1, router R1 has two neighbor nodes (R2 and R3), and two corresponding entries in the neighbor table. Table 1 indicates that both R2 and R3 are exploration-capable and router R2 has a higher assigned priority than router R3. Based on this priority, router R2 would be selected from the neighbor table before router R3. For this example, suppose that the normal next hop node is router R3. If the link from R1 to R3 has adequate resources for the requested data flow, then the alternate route exploration procedure is not required, and the connection request message is sent directly to router R3 without utilizing the neighbor table for R1.

Router priority is maintained for each node in a neighbor table. This priority may be determined by the network administrator based on factors such as network topology, network usage patterns, data flow through various portions of the network, and known or anticipated congested network nodes or links. For example, a network administrator may assign priorities to neighbor nodes based on their proximity to the center of the network mesh. Nodes located closer to the center of the network mesh may be assigned higher priorities because connection requests are often received from the outer edge of the mesh and propagate toward the center of the network. Assigning higher priorities to nodes closer to the middle of the mesh facilitates the establishment of a path across the network.

Continuing with the above example, router R3 receives the connection request message from router R1 and determines a next hop router for the requested data flow. If the normal next hop node from R3 is R5, alternate route exploration will be required since router R5 is not ST2-capable (i.e., not protocol-capable). The neighbor table for router R3 is illustrated in Table 2 below.

TABLE 2

| Neighbor Node | Exploration-Capable? | Priority |
| --- | --- | --- |
| R4 | Yes | 1 |
| R1 | Yes | 2 |
| R5 | No | X |

As shown in Table 2, router R3 has three neighbors (R1, R4 and R5). Both routers R1 and R4 are exploration-capable, and have priorities 2 and 1, respectively. As indicated in Table 2, Router R5 is not exploration-capable, and therefore has no assigned priority. Using the alternate route exploration procedure, router R3 ignores the normal next hop node (R5) in the neighbor table, thereby removing router R5 from consideration as an alternate node. Similarly, the ingress node R1 is ignored in the neighbor table for R3 to avoid selecting an alternate path back to the ingress node. After removing nodes R5 and R1 from consideration, the neighbor table for R3 contains an entry for router R4 only. Therefore, router R4 is selected as the alternate node from the neighbor table. If the link from router R3 to R4 has sufficient resources for the data flow, then router R3 sends the connection request message to router R4. If the link from router R3 to R4 does not have sufficient resources, then a connection refusal signal is generated since no other neighbor nodes remain in the neighbor table.

If the link from R3 to R4 has sufficient resources, then router R4 receives the connection request message from router R3. Router R4 then determines the normal next hop for the path which, in this example, is to router R6. If the link from R4 to R6 has sufficient resources for the data flow, then the connection request is sent to router R6. Since destination node 12 is coupled to router R6, the connection request message will be sent to the destination node if the link between R6 and the destination has sufficient resources for the data flow. At this point, the procedure terminates, having found a path from source node 10 to destination node 12.

Figure 4:
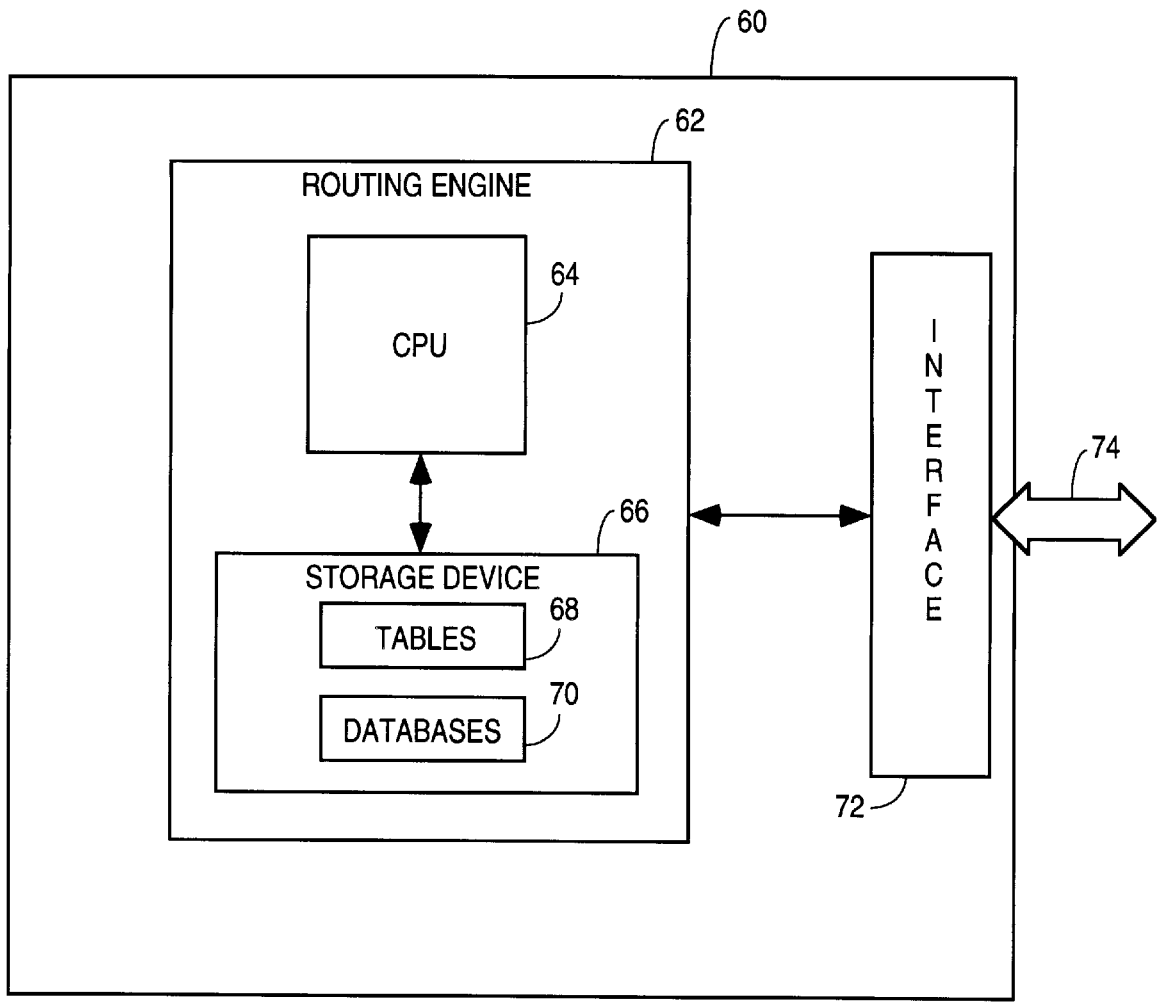
FIG. 4 is a block diagram of a communications device capable of implementing the teachings of the invention.

FIG. 4 illustrates a block diagram of a communications device 60 capable of implementing the teachings of the invention. As discussed above, an embodiment of the communications device may be a router. This embodiment will be described with respect to FIG. 4. Communications device 60 includes a routing engine 62 having a CPU 64 and a storage device 66. Storage device 66 may be a memory, disk drive, or other mechanism capable of storing data. Routing engine 62 includes various routing tables 68 and databases 70 contained within storage device 66. Tables 68 and databases 70 may include information necessary for communications device 60 to properly forward data and identify alternate paths. Databases 70 may include a Link State Database and a Forwarding Database. Tables 68 may include one or more neighbor tables. Routing engine 62 is capable of calculating paths through a network based on information contained in routing tables 68 and databases 70. An interface 72 is coupled to routing engine 62 and provides a physical connection to one or more network links 74. A single interface 72 is illustrated for clarity. However, a particular communications device may have multiple interfaces 72 coupled to multiple network links 74. Those skilled in the art will appreciate that other types of communications devices may be used to implement the teachings of the invention.

The procedures discussed herein may be used with any connection-oriented protocol having resource reservation capabilities. Furthermore, the route exploration procedures discussed herein may be supported by some nodes in the network, but not supported by other network nodes. In this situation, the procedures will function properly in the routers capable of supporting the route exploration functionality. These procedures are transparent to the non-supported network nodes and does not change the operation of the non-supported network nodes. Thus, it is not necessary that all network nodes be capable of route exploration to utilize the inventive system described herein.

As mentioned above, the present invention may be used with any connection-oriented protocol having resource reservation capabilities, including Asynchronous Transfer Mode (ATM). Those skilled in the art will appreciate that the procedures illustrated in FIG. 2 and FIG. 3 may be implemented using ATM switches or other network devices in an ATM network. Additionally, in an ATM network, each node may determine whether the next hop node can accept the particular class of service. For example, a particular node may be capable of accepting Available Bit Rate (ABR) traffic or Unspecified Bit Rate (UBR) traffic, but not capable of accepting Constant Bit Rate (CBR) traffic. Thus, in addition to determining whether the next hop node has adequate resources, the system may determine whether the next hop node can accept the requested class of service.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for selecting an alternate route for a data flow in a network using a connection-oriented protocol, said method responsive to a connection request, said method comprising the steps of:

identifying an alternate next hop node in said network having adequate resources and capable of accepting said data flow;

sending said connection request to said alternate next hop node; and generating a refusal message if said connection request to said alternate next hop node fails.

2. The method of claim 1 wherein the step of identifying an alternate next hop node is performed only once.

3. The method of claim 1 wherein the step of identifying an alternate next hop node includes identifying a limited number of alternate next hop nodes.

4. The method of claim 1 wherein said method is implemented when a normal next hop node has inadequate available resources.

5. The method of claim 1 wherein said method is implemented when a normal next hop node is incapable of accepting said data flow.

6. The method of claim 1 wherein said network is an asynchronous transfer mode (ATM) network.

7. The method of claim 1 wherein said network is a Frame Relay network.

8. The method of claim 1 wherein said network utilizes a switching system product to provide branch exchanges in communication networks.

9. The method of claim 1 wherein said network utilizes a transmission system product to provide interconnections between networks and network subscribers.

10. The method of claim 1 wherein the step of identifying an alternate next hop node includes selecting a highest priority node from a neighbor table.

11. A method for routing data in a network using a connection-oriented protocol, said method comprising the steps of:

receiving a connection request from an ingress node;

sending said connection request to a normal next hop node if said normal next hop node has adequate resources and said normal next hop node is capable of accepting said requested connection; and performing an alternate route exploration if said normal next hop node lacks adequate resources for the requested data flow or is incapable of accepting said requested connection.

12. The method of claim 11 wherein said normal next hop node is determined using a lookup table.

13. The method of claim 11 wherein the step of performing an alternate route exploration is performed only once.

14. The method of claim 11 wherein the step of performing an alternate route exploration includes identifying a limited number of alternate next hop nodes.

15. The method of claim 11 wherein said network is an asynchronous transfer mode (ATM) network.

16. The method of claim 11 wherein said network is a Frame Relay network.

17. The method of claim 11 wherein said network utilizes a switching system product to provide branch exchanges in communication networks.

18. The method of claim 11 wherein said network utilizes a transmission system product to provide interconnections between networks and network subscribers.

19. The method of claim 11 wherein the step of performing an alternate route exploration includes:

identifying an alternate next hop node having adequate resources;

sending said connection request to said alternate next hop node; and generating a refusal message if said connection request sent to said alternate next hop node fails.

20. The method of claim 11 wherein the step of performing an alternate route exploration includes selecting a highest priority node from a neighbor table.

21. An apparatus for routing data in a network using a connection-oriented protocol, comprising:

a receiving mechanism adapted to receive a connection request from an ingress node;

a sending mechanism coupled to said receiving mechanism and adapted to send said connection request to a normal next hop node if said normal next hop node has adequate resources and said normal next hop node is capable of accepting said requested connection; and an alternate route exploration mechanism coupled to said sending mechanism and configured to perform an alternate route exploration if said normal next hop node lacks adequate resources for the requested data flow or is incapable of accepting said requested connection.

22. The apparatus of claim 21 wherein said sending mechanism determines said normal next hop node using a lookup table coupled to said sending mechanism.

23. The apparatus of claim 21 wherein said network is an asynchronous transfer mode (ATM) network.

24. The apparatus of claim 21 wherein said alternate route exploration mechanism includes a neighbor table identifying neighboring nodes.

25. The apparatus of claim 21 wherein the apparatus comprises a switching system product to provide branch exchanges in communication networks.

26. The apparatus of claim 21 wherein the apparatus comprises a transmission system product to provide interconnections between networks and network subscribers.

27. An apparatus for selecting an alternate route for a data flow in a network using a connection-oriented protocol, said apparatus responsive to a connection request, comprising:

means for identifying an alternate next hop node in said network having adequate resources and capable of accepting said data flow;

means for sending said connection request to said alternate next hop node; and means for generating a refusal message if said connection request to said alternate next hop node fails.

28. The apparatus of claim 27 wherein said network is an asynchronous transfer mode (ATM) network.

29. The apparatus of claim 27 wherein said means for identifying an alternate next hop node includes a neighbor table containing neighboring node information.

* * * * *